WIRE LEAD NIPPING TOOL

Filed Oct. 26, 1961

April 13, 1965 H. R. FISCHER ETAL 3,177,583

WIRE LEAD NIPPING TOOL

Filed Oct. 26, 1961

3 Sheets-Sheet 2

United States Patent Office 3,177,583

Patented Apr. 13, 1965

3,177,583

WIRE LEAD NIPPING TOOL

Howard R. Fischer, New Hartford, Livio F. Marcantonio, Utica, and Marcel P. D'Haem, New Hartford, N.Y., assignors to Chicago Pneumatic Tool Company, New York, N.Y., a corporation of New Jersey Filed Oct. 26, 1961, Ser. No. 147,956

11 Claims. (Cl. 30—180)

This invention is directed to power operated wire nipping tools adapted to be operably held in the palm of one hand. The invention is particularly useful in the electronics industry for production nipping or severing of wire leads.

In the electronics industry the large scale production and assembly of printed circuit boards, computers, television and radio sets, instrument panels, controls and other electronic devices, require the nipping or severance of countless wire leads or electric conductors. Not only those leads which are easily reached but also those which are located deep in the instrument or in difficult places must be nipped off. The leads that are nipped are usually soft copper wires and solder puddles of various small diameters. The operation is sometimes made through a single wire; sometimes, through two or three closely grouped wires of small diameter; and sometimes, through solder puddles. The electronics industry hires numerous workers, who spend their time nipping off wire leads, clipping as many as several thousand a day. Conventional hand powered cutting tools present various problems and difficulties when used for production cutting of wire leads. The repeated manual pressure required in the countless operations of the tool in a day's work unduly tires the worker. Their structure and mode of operation often makes it difficult for them to be maneuvered into close quarters or to make clean cuts.

Accordingly, an object of this invention is to provide a power operated wire nipping tool which will avoid the difficulties commonly associated with conventionally used wire lead cutting tools.

Another object of this invention is to provide a power operated wire nipping tool which is especially suited for production nipping of wire leads in the electronics industry and is adapted to be operably held in the palm of one hand.

While the tool of the present invention is especially suited for use in the electronics industry, it is subject to applications in other industries such as the plastics industries wherein it may be used in cutting flash or interconnecting portions of parts molded from plastics.

A feature of the invention lies in its light weight which enables it to be carried and used continuously throughout the working day with a minimum expenditure of energy on the part of the operator.

Another feature of the invention lies in its small size and rounded body which enables it to fit comfortably in the palm of the hand, and enables it to be rotated in the hand to any convenient operating position.

A further feature of the invention lies in a pneumatic throttle control arrangement for operating the tool, which arrangement includes a manipulative lever that may be adjusted for operation of the throttle valve with a minimum of manual effort.

Another feature of the invention lies in the nature of its nipping head. This may be easily manually rotated as desired relative to the body of the tool to any desired nipping position, whereby the tool may be used without difficulty or appreciable loss of time to nip off wire leads in close quarters, as well as in accessible locations.

A still further feature of the invention lies in an arrangement which enables the operator to adjust the length of the piston stroke and as a consequence to selectively open the jaws wide or close as desired. The jaws may be adjusted to a wide open condition for clipping wires of thick diameter; and they may be adjusted to a close condition for clipping thinner wires or for probing between closely spaced wires to reach wires in close quarters.

The invention further lies in the particular construction of the components thereof and also in their cooperative association with one another to effect the results intended herein.

Tools or pliers having a pair of jaws which are caused to move selectively between an open jaw position and a substantially closed jaw position by means of a fluid actuated cam piston cooperating with a cam follower on the arm of one of the jaws are known from Fischer et al. U.S. Patent 2,942,507, granted June 28, 1960. The tool disclosed in the latter patent has jaws carrying die elements for purposes of crimping or metal bending operations; whereas, the tool of the present invention has jaws carrying cutting edges which are adapted to fully meet for purposes of nipping or severing wire leads. The tool of the present invention has further advantageous features relative to the mode of association of the piston with the jaw member and the cylinder head of the tool, which are not provided by the tool of the said patent.

The foregoing and other objects and advantages of this invention will appear more fully hereinafter from a consideration of the detailed description which follows, taken together with the accompanying drawings wherein an embodiment of the invention is illustrated. It is to be expressly understood, however, that the drawings are for purposes of illustration and description, and they are not to be construted as defining the limits of the invention.

Figures 1, 2, 3, 4:
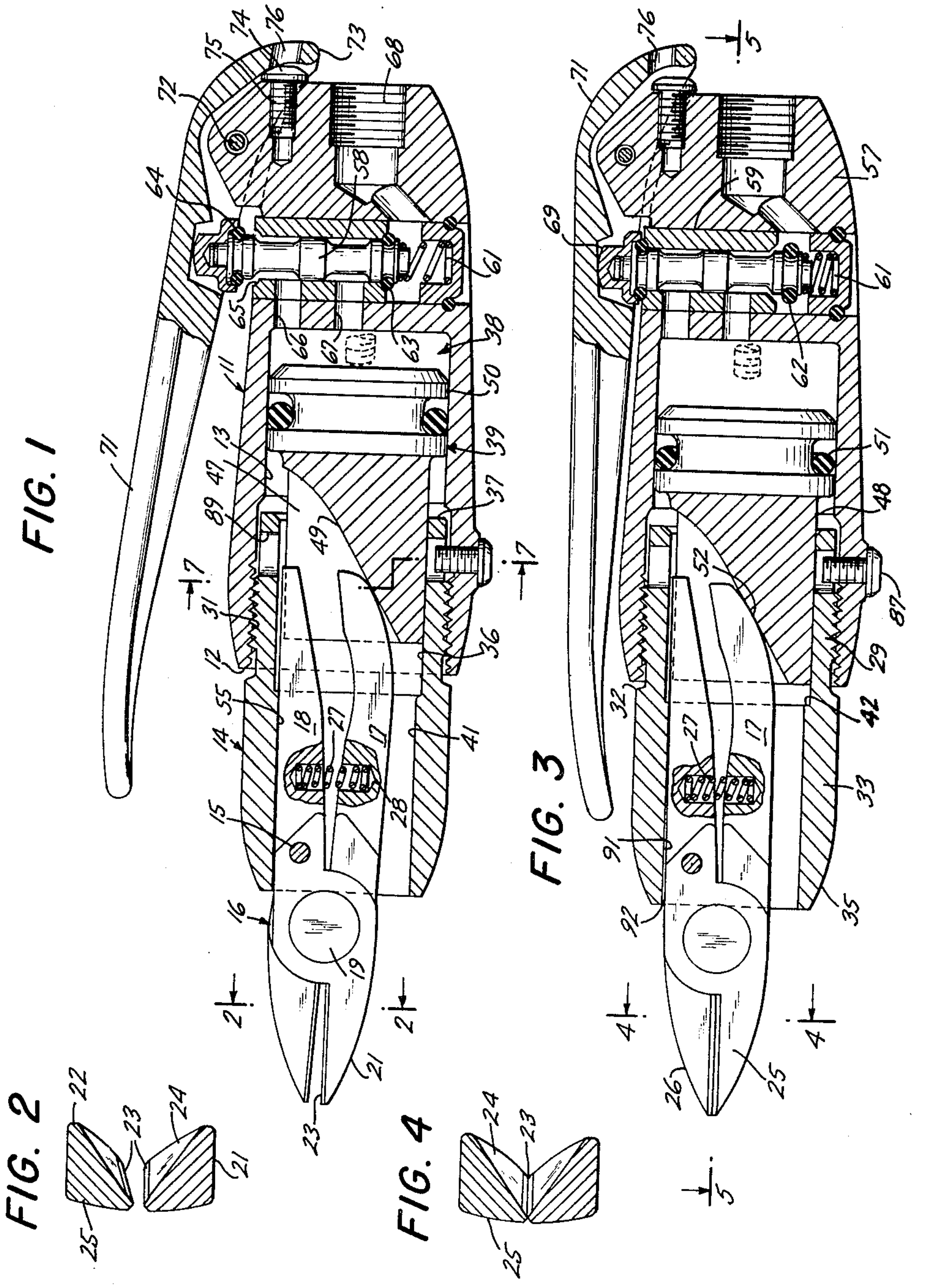
FIG. 1 is a longitudinal sectional view showing the tool in its normal or inoperative condition.
FIG. 2 is a cross section of the jaws in open condition, taken on line 2—2 of FIG. 1.
FIG. 3 is a sectional view that is similar to FIG. 1, but shows the tool in operated condition.
FIG. 4 is a cross section of the jaws in closed condition, taken on line 4—4 of FIG. 3.

Reference is now directed to the accompanying drawings to provide a more detailed understanding of the invention. This illustrative tool is compact and small in size, and includes a main housing body member 11 of cylindrical or rounded contour enabling it to be comfortably held in the palm of the hand in any convenient operating position. Opening through the front end 12 of the housing is an axially extending bore or recess 13. Supported in the front part of this recess is a cylinder head 14 in which a wire nipper implement 16 is pivotally mounted on a lateral axis defined by a pin 15. The nipper implement, or pair of nippers as it might be called, comprises a pair of levers 17 and 18 which cross one another and are pivotally connected to each other by means of a pivot pin 19 located externally of the cylinder head. Only the lever 18 of the nipper implement is pivoted on the cross pin 15 within the recess 13 of the cylinder head. Each lever has a rearwardly extending arm or handle and has at its forward end a cutting jaw, one of which jaws is designated 21 and the other 22. The jaws are of the type wherein the cutting edges 23 of both jaws meet edge upon edge in closed position; the front faces 24 (FIGS. 10 and 12) of the jaws are recessed inwardly at an angle to each other; and the back faces 25 of the jaws provide substantially flat surfaces declining slightly from the cutting edges toward the outer curved surfaces or spines 26 of the jaws. Jaws of this type are of advantage in that they can be located with their back faces 25 against a wall surface for close nipping of wire leads.

The jaw cooperate with one another to effect a cutting operation when the arm of lever 17 is drawn toward the arm of lever 18. This action of the arms is made against the resistance of a spring 27 seated at its ends in a pair of opposed pockets 28 formed in the inner walls of the arms. The spring biases the arms away from one another so that the jaws are normally in open condition, as in FIGS. 1 and 2.

The cylinder head 14 in which the nipper member is pivotally mounted on the cross pin 15, comprises a rear cylindrical portion 29 which is threadedly received as at 31 in the forward part of the recess 13 of the housing 11. A radial annular shoulder 32 about the cylinder head is cooperable with the end wall 12 of the housing to limit the extent to which the cylinder head may be entered into the latter. The cylinder head further comprises a forward portion 33 extending axially and externally of the housing beyond the shoulder 32. This foward portion is of general rectangular configuration as can be seen from FIGS. 6, 9 and 10, having flat side faces 34; and it is relatively narrower than the rear portion 29. The marginal end of the cylinder head is rounded inwardly to provide a nosed or probing end 35 for the tool. The jaws 21 and 22 of the nipper implement are located beyond this nosed end. The curved outer surface 26 of each jaw tapers inwardly toward the extremity of the cutting edge 13 of the jaw so that when the jaws are in closed position as in FIG. 3 they define a substantially pointed nose. This narrow nosed feature of the cylinder head, together with the pointed nose feature of the jaws enables the front end of the tool to be inserted and probed down into tight places to cut off hard to reach leads.

The cylinder head 14 is further characterized by the nature of its interior. It is hollow and open at both ends. The interior 36 of the rear portion of the cylinder head is cylindrical and, together with that portion of the recess 13 located rearwardly of the end wall 37 of the cylinder head defines a piston cylinder, generally designated 38, in which a cam piston 39 reciprocates or works. The interior 41 of the forward portion of the cylinder head is of rectangular configuration (FIGS. 5 and 6) and relatively narrower than the rear interior portion 36, so that a shoulder 42 is provided between the interior areas 36 and 41.

The arms of the levers 17 and 18 of the nipper implement extend through the narrow front area 41 of the cylinder head axially into the cylindrical rear area 36. The arms of the levers 17 and 18 are relatively thicker about the cross pin 15 and provide at opposite sides of this area flat faces 43 which bear against the interior parallel side faces 44 of the cylinder head. This arrangement of the nipper implement in the cylinder head enables both of these members to be rotated as a unit as the cylinder head is threadedly entered into the housing 11 during assembly or rotative adjustment of the cylinder head relative to the housing.

The rear terminal portions of the arms of the levers 17 and 18 extend into a cam slot 47 formed centrally and longitudinally of a cylindrical extension 48 of the piston. The outer surface of the piston extension bears upon the wall surface of the area 36 of the cylinder head. An enlarged cylindrical head 50 of the piston bears upon the internal wall of the recess 13 rearwardly of the cylinder head. An O-ring 51 fitted in a peripheral groove of the piston head provides a peripheral seal for the latter within the piston cylinder.

The terminal portion of the arm of lever 17 has an upwardly curved or cammed undersurface 52 which always rests upon a cam slide or bottom surface 49 of the cam slot 47, whether the piston is in its forward or returned position. The spring element 27 continuously exerts a separating action upon the arms of levers 17 and 18 so that the cam end 52 of the arm of lever 17 is pressed upon the cam slide 49, and so that a small area of the outer back surface of the arm of lever 18 abuts the interior wall of the cylinder head, as at 55. The side walls 56 of the cam slot are flat and parallel to each other and in bearing contact with the side areas of the arms of levers 17 and 18, as appears in FIGS. 5 and 7. In the normal or open condition of the jaws 21 and 22 the cam end 52 of the arm of lever 17 rests upon the lower area of the cam slide, as in FIG. 1.

It can be seen by reference to FIGS. 1 and 3 that, as the piston moves forwardly, the arm of lever 17 will ride up the cam slide and will close its jaw 22 fully upon the jaw 21 of the arm of lever 18; and that the reverse action occurs as the piston moves rearwardly.

The piston is pneumatically driven on its work stroke; and it is spring driven on its return stroke. Manipulative throttle control means arranged in a back head portion 57 of the housing is provided to control flow of pneumatic operating power such as live air to the rear of the piston cylinder. This means includes a throttle slide valve 58 movable in a bushing 59 to control pneumatic flow into and out of the piston cylinder. The throttle valve has a normal or inoperative position, as in FIG. 1, wherein it is loaded by a spring 61 so that an O-ring 62 seals over an inlet port 63, and an O-ring 64 is clear of a vent port 65; whereby an exhaust orifice 66 of the piston cylinder is vented to atmosphere, and an inlet orifice 67 is sealed off from a pneumatic pressure supply inlet 68. In this normal position of the throttle valve, the spring 61 acts through the throttle valve and a nosed cap 69 on an external end of the latter to press a manipulative lever 71 clockwise (FIG. 1) about a pivot pin support 72, so that a curved tail end 73 of the lever abuts against the head 74 of a screw 75 threaded into the back head 57 of the housing.

Manually pressing the lever counter-clockwise (FIG. 3) down upon the cap 69 of the throttle valve will shift the latter to its operative position, wherein the O-ring 64 seals over the vent 65, and the O-ring 62 is clear of the inlet 63. Pressure air will then flow through ports 68 and 67 to the piston chamber to drive the piston forwardly on its work stroke.

The screw 75 may be adjusted as desired outwardly relative to the backhead of the housing. A hole 76 in the tail end of the lever 71 enables a screw driving tool, such as a hex key, to be applied to a socket in the head of the screw to permit adjustment of the screw. It is clear that, as the head of the screw is threaded outwardly, it will pivot the lever counter-clockwise against the throttle valve to cause the latter to move inwardly to a corresponding degree. This arrangement avoids lost motion between the lever and the throttle valve and holds the lever in abutment with the latter.

Spring power provided by a pair of coil spring elements 77 (FIGS. 5 and 7) serves to return the piston to its inoperative position as the throttle valve is released and as the piston cylinder is vented. The spring elements are disposed in parallel relation to each other at diametrically opposite areas of the piston. They are seated at their rear ends on the flat bottoms 78 of a pair of parallel grooves 79 formed longitudinally of opposite areas of the piston extension 48. The forward ends of the springs extend beyond the front ends of the grooves 79. A guide pin 81 slidably inserted in the forward end of each spring has a flat head 82 which is pressed by the spring against the flat bottom of the shoulder 42 of the cylinder head. A slight peripheral portion of the springs project from the grooves of the cylinder head into shallow complementary guide grooves 70 in the cylinder head 4. The springs, which are compressed on the work stroke of the piston, act to return the piston as the pressure of air trapped at the rear of the piston cylinder is vented when manual pressure on the lever 71 is relaxed.

At times, it may be desired that the piston have a short stroke. A piston stroke regulating screw 84 is provided. The latter is threadable through an elongated tapped hole 85 of the backhead into the rear of the piston cylinder. When the screw is extended into the piston cylinder, it cooperates with the rear end of the piston 50 to limit the extent of the return movement of the latter. The screw bore 85 opens to the outside of the backhead whereby access to it may be had by a suitable screw driving tool.

A further advantage is provided by the adjusting screw in that as the screw is extended into the piston chamber it causes the piston to cooperate with the arm of lever 17 to draw jaw 22 closer to jaw 21; and as the screw is backed away or out of the piston chamber it causes the piston to allow the jaw 22 of lever 17 to move apart from jaw 21. The further the screw is extended into the piston chamber, the closer will the jaws be drawn to one another; and the further the screw is backed out, the wider apart will the jaws be spread. The limit to which the jaws may be spread apart will be reached when the screw is backed fully out of the piston chamber and the piston is pressed under the load of the return springs against the bottom wall 80 of the piston chamber. This feature enables the jaws to be narrowed by being drawn close together for cutting thin wires or to permit the jaws to be moved between closely spaced wires without interference; and yet this feature also permits the jaws selectively to be opened wide under different conditions for cutting thicker wires.

It was earlier mentioned that the nipper implement 16 and the cylinder head 14 were rotatable as a unit relative to the housing 11. It was also mentioned that the arms of levers 17 and 18 of the nipper implement are always disposed in part within the cam slot 47 of the piston and that the side areas of the arms are in bearing contact with the adjacent parallel walls 56 of the cam slot. This arrangement of the nipper implement, cylinder head, piston and housing to one another is of decided advantage. It enables the cylinder head, nipper implement and piston as a unit to be manually rotated, because of the threaded connection of the cylinder head with the housing, relative to the latter without changing the position of the housing. Accordingly, the operator may hold the housing body of the tool in the palm of one hand in the most convenient position for manipulation of the lever 71; and he may threadedly rotate the cylinder head in one direction or the other until the nipper jaws are in the most advantageous position for any particular wire lead to be severed. This enables the tool to be inserted in close quarters to reach difficult leads, and yet enables the operator to hold the tool in the most comfortable position with respect to his usual operating hand. That is, a left handed operator may rotatively adjust the nipper jaws so that they face in one direction; and a right handed operator may adjust the jaws so that they face in another direction.

Figures 5, 6, 7, 8, 9, 10, 11:
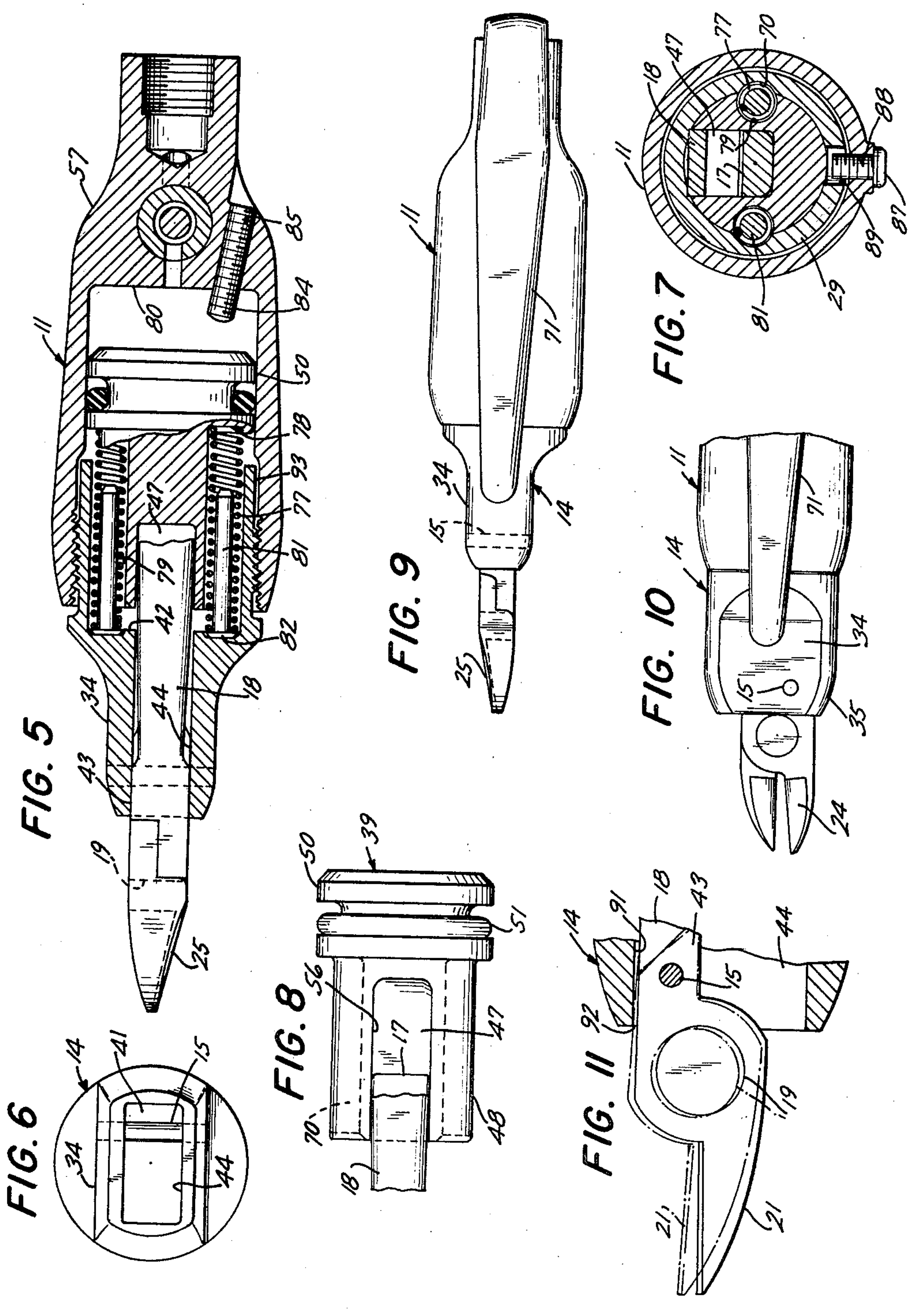
FIG. 5 is a plan section taken on line 5—5 of FIG. 3.
FIG. 6 is a front end view of the cylinder head itself with the nipper implement omitted, but showing the cross pin on which the nipper implement pivots.
FIG. 7 is a cross sectional view taken on line 7—7 of FIG. 1.
FIG. 8 is a fragmentary detail in plan showing the relation of the terminal portions of the nipper arms to the piston slot.
FIG. 9 is a plan view showing the cutting head rotated 180 degrees from the position shown in FIG. 1.
FIG. 10 is a fragmentary view showing the cutting head rotated 90 degrees from the position shown in FIGS. 5 and 9.
FIG. 11 is a detail showing in full line the normal position of that arm of the nipper implement which is pivoted to the cylinder head, and showing in broken line position the pivoted position of said arm relative to the cylinder head.
Figure 12:
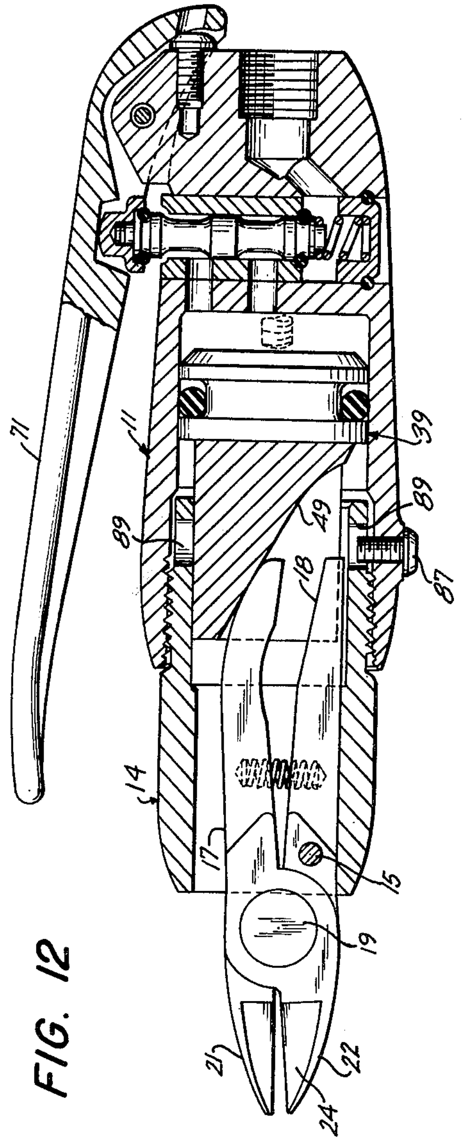
FIG. 12 is a longitudinal section through FIG. 9 but on a scale similar to that of FIG. 1.

A lock screw 87 may be used to supplement the threaded friction engagement of the cylinder head in the housing to lock the cylinder head in any selected rotated position. The lock screw may be threaded through a hole 88 in the wall of the housing to enter a selected one of two locating holes 89 located 180° apart in the cylinder head. The locating holes 89 are relatively larger in diameter than the screw 88 so that whether the cylinder head is rotated 180 degrees in one direction or 180 degrees in the other, one of the locating holes will register with the lock screw to receive the latter. FIG. 1 shows the lock screw as engaged in one of the locating holes; and FIG. 12 shows the lock screw as engaged in the other of the locating holes. The cylinder head may be adjusted to any intermediate rotated position relative to the FIG. 1 and 12 positions. FIG 10 shows the cylinder head 14 as having a position 90° turned from the positions shown in FIGS. 1 and 9 or 12. In the intermediate positions, the lock screw limits tightly against the outer surface of the cylinder head to retain the latter in its selected position.

It is also to be noted that the cross pin 15, upon which the arm 18 of the nipper member is pivoted to the cylinder head, is so located below the overhead wall 91 that a clearance 92 exists between the arm 18 and the latter wall. This clearance enables the arm 18 to pivot to a limited degree relative to the cylinder head and to the arm 17, when pressure is applied inwardly on the spine 26 of the related jaw when the jaws are in open position. Such pivoting action is against the opposing action of the spring 27. It is also clear that the jaw 22 of the arm 17 may be pivoted inwardly against the pressure of the spring 27 by pressing inwardly upon the spine 26 of the jaw. This pivoted arrangement and pivoting inclination of the jaws is of decided advantage both in the use of the tool, and also as a protective measure. In the use of the tool, obstructing instrument walls are often close to a wire lead so as to block normal entry of the open jaws to enable severance of the lead; but, by simply pressing one or the other of the open jaws against the obstructing wall it is possible to draw the jaws in sufficiently to enable the wire lead to be reached and severed. If, at times, during the use of the tool, the tool is accidentally dropped so that its jaw ends strike a hard surface, one or the other of the open jaws will yieldably pivot inwardly to a limited degree against the resistance of the spring 27. The yielding action of the jaw against the spring will cushion and absorb the shock of the fall and thus obviate damage to the jaws or cylinder head that might otherwise occur if such pivoting action were not possible.

A further feature of the invention is provided by a plain extension 93 of the cylindrical portion of the cylinder head beyond the threaded surface 31 of the latter. This facilitates threaded assembly of the cylinder head in the housing 11 relative to the piston without twisting or damaging the return springs 77. In assembling the cylinder head into the housing, the piston is first inserted through the open end 13. The adjusting screw 84 is then threadedly extended into the piston cylinder so as to move the piston forwardly until the front end of the latter is even with the end wall 13, it is then backed away from the piston head a distance corresponding to one or two of the threads. Next, the headed ends of the spring guide pins are aligned for entry into the guide grooves 70 of the cylinder head; the tail ends of the nipper arms 17 and 18 are aligned with the cam slot of the piston and entered therein as the cylinder head is inserted into the housing to the extent of the plain extension 93. The cylinder head is then rotated a turn or two to engage its threads with those of the housing; the piston is carried about by the tail ends of the nipper arms as this is done. The adjusting screw may then be backed further out to permit the cylinder head to be threaded further into the housing to the extent desired.

It is to be understood that the terms forward, rearward, upper and lower, as used in the specification are relative and not absolute, as the tool can be held in any position and functions the same way irrespective of gravity.

The nipper implement is of steel construction, and the portion thereof forwardly of the cross pin 15 is of standard structure. The cylinder head 14 is preferably formed of a lightweight metal, such as aluminum. The housing body 11 may be formed of a lightweight metal or plastic, preferably a material having properties of toughness and high impact strength. A plastic having these characteristics is known by the trademark "Delrin."

Figure 13:
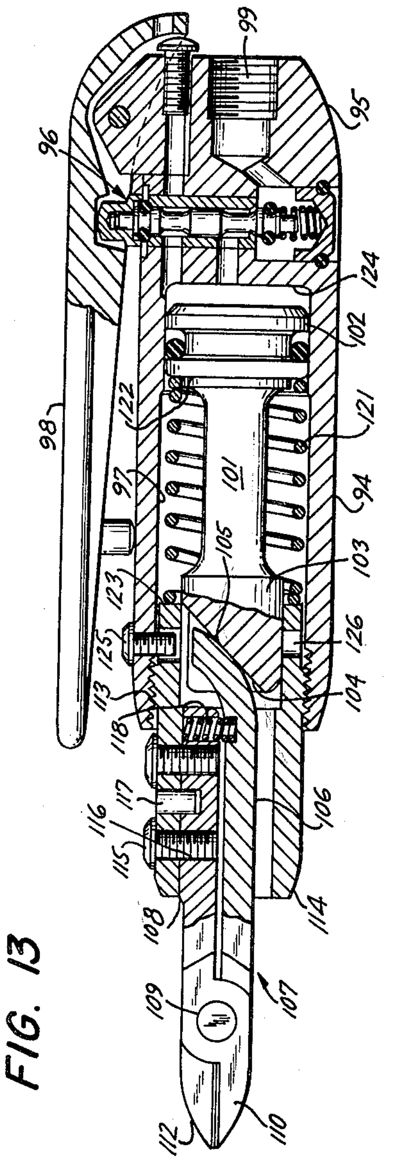
FIG. 13 is a longitudinal section through a modified form of the tool.

Reference is now directed to FIG. 13 showing a modified form of the invention. This form differs from that shown in FIG. 1 primarily in the means for returning the piston, and in the arrangement of the nipper element in the cylinder head.

The modified form includes an elongated housing body 94 of cylindrical or rounded contour having a backhead 95 fitted with a throttle valve mechanism 96 corresponding to that shown in FIG. 1, which is similarly actuable by a manipulative lever 98 to control flow of operating fluid to a piston cylinder 97 from an intake port 99 to drive a cam piston 101 forwardly on a power stroke.

The piston includes a rear portion 102 having a forward extension 103 centrally of which extension is formed a cam track or slide 104. Engaging the cam track at all times is a cam undersurface 105 formed at the tail end of a lever or handle 106 of one element of a nipper implement 107. The latter includes a second lever 108. The levers 106 and 108 cross each other intermediately of their ends, at which point they are connected to one another by means of a pivot pin 109.

Cutting jaws 110, 112 corresponding to the jaws 21, 22 of the form disclosed in FIG. 1, are formed at the forward ends of the levers. The levers are disposed in a hollow cylinder head 114 which is threaded at its rear portion 113 in the front end of the housing body 94.

Lever 106 is pivotable on the pin 109 relative to the lever 108. The latter is stationary at all times. It is rigidly fastened to the cylinder head by means of a pair of screws 115, the shanks of which extend through complementary holes in the cylinder head and are threadedly tightened in holes 116 tapped in the lever 108. An aligning pin 117 is disposed in the cylinder head in parallel relation to the screws 115, and is received in a complementary recess of the lever 108. A compression spring 118 seated at its ends in opposed pockets of the levers 106 and 108 exerts a separating force upon the levers so as to continuously press the cam undersurface 105 of the tail end of lever 106 upon the surface of the cam track 104.

In the operation of this modified form of the tool, as the piston is moved forwardly under the influence of pressure fluid admitted to the piston cylinder, the cam end of the lever 106 is caused to ride up the cam track 104 to close its jaw upon the jaw of lever 108. As the throttle lever is relaxed causing the throttle valve 96 to shut off flow of pressure fluid and to vent the piston cylinder of spent fluid, a return spring 121 compressed between a shoulder 122 of the piston and an end wall 123 of the cylinder head expands to return the piston to its rear position to abut the back wall 124 of the piston cylinder.

An adjusting screw not shown, similar to the screw 84 shown in FIG. 5 may be incorporated in the modified form of the tool.

The cylinder head 114, together with the nipper implement 107 and piston 101 is rotatively adjustable relative to the housing body 94 similarly to the mode of adjusting the cylinder head in the form disclosed in FIG. 1. A lock screw 125 in the housing body cooperates with the cylinder head and with a pair of diametrically opposed holes 126 in the cylinder head in the same manner as the corresponding elements do in the form shown in FIG. 1.

While two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art and it is our intent, therefore, to claim the invention not only as shown and described herein, but also in all such forms and modifications as may reasonably be construed to fall within the spirit of the invention and the scope of the appended claims.

What is claimed is:

1. A nipping tool for cutting wires and the like, comprising a housing having a recess in its front end, an open-ended cylinder head fitted in the open end of the recess having a cylindrical interior area, the latter area and recess combining to form a piston chamber, a piston reciprocable in the latter having a cam slide centrally thereof, a nipper implement including a pair of crossed levers pivotally connected together, said levers having cooperating cutting jaws at their forward ends and arms at their rear ends, the cylinder head having a rectangular interior area forwardly of its cylindrical interior area, the arms of the nipping implement extending through the rectangular area, one of the arms having a cam follower outer surface at its rear end resting upon the cam slide and adapted upon reciprocation of the piston to ride up and down the slide, the other arm being supported by the cylinder head, spring means biasing the arms apart and simultaneously biasing the jaws apart and means for selectively adjusting the degree to which the jaws may be biased apart.

2. A nipping tool as in claim 1, wherein the cylinder head has a rectangular outer wall portion externally of the housing providing a pair of external flat outer surfaces manipulative by hand to effect rotation of the cylinder head relative to the housing.

3. A nipping tool as in claim 1, wherein the cylinder head has a threaded connection with the housing and includes annular radial external shoulder means for limiting the extent to which the cylinder head may be threaded into the housing.

4. A nipping tool as in claim 1, wherein a pivot pin extends transversely through the cylinder head and said other arm to pivotally support the latter arm and as a consequence the nipper element to the cylinder head, the pin having a location enabling limited pivoting of said arm and the associated jaw relative to the housing against the bias of said spring means, whereby the said pivoted arm is adapted when dropped upon its associated jaw to yieldably pivot against the spring means to cushion said jaw against the shock of the fall.

5. A nipping tool for cutting wires and the like, comprising a housing having a recess in its front end, an open-ended cylinder head fitted in the open end of the recess having a cylindrical interior area, the latter area and recess combining to form a piston chamber, a piston reciprocable in the latter having a cam slide centrally thereof, a nipper implement including a pair of crossed levers pivotally connected together, said levers having cooperating cutting jaws at their forward ends and arms at their rear ends, the cylinder head having a rectangular interior area forwardly of its cylindrical interior area, the arms of the nipping implement extending through the rectangular area, one of the arms having a cam follower surface resting upon the cam slide and adapted upon reciprocation of the piston to ride up and down the slide, the other arm being supported by the cylinder head, and spring means biasing the arms apart and simultaneously biasing the jaws apart; wherein spring loaded throttle valve means is provided in the housing to control flow of pneumatic operating fluid to the piston chamber to drive the piston on a forward stroke, a manipulative lever having a pivot support on the housing is cooperable with the throttle valve to actuate the latter against the spring load to admit pneumatic fluid to the piston chamber, and screw means adjustably threaded into the housing is cooperable with the lever to predetermin the extent of required movement of the latter to actuate the throttle valve.

6. In a nipping tool including a housing having a recess in one end; a hollow cylinder head having a rear portion threadedly engaged in the recess and having a forward portion externally of the housing, the rear portion of the cylinder head having an axially extending opening defining together with the recess a piston chamber, a piston having a headed end reciprocable in the piston chamber rearwardly of the cylinder head and having an extension slidable in the said axial opening of the cylinder head, a pair of parallel longitudinally extending recesses formed in opposite areas of the said extension of the piston, spring elements confined in part in the recesses and extending in part from the recesses into the axial opening of the cylinder head, a shoulder within the cylinder head providing an abutment for the spring elements, the spring elements being compressible into the recesses upon forward movement of the piston relative to the cylinder head and the spring elements adapted when relaxed to move the piston rearwardly relative to the cylinder head, a cam slide defined by the extension of the piston, a nipper implement having a pair of crossed nipper levers pivotally connected to one another and received in the cylinder head, a spring disposed between the levers rearwardly of the pivot connection biasing the levers apart, a pin located rearwardly of the pivot connection, the pin extending transversely through the cylinder head and one of the levers and restraining the said lever against axial movement relative to the cylinder head, and the other lever not associated with said pin having a follower at its rear end cooperable with the cam slide for relative movement thereover as the piston is reciprocated.

7. For use with a tool housing having a cylinder recess in one end which is internally threaded adjacent its open end, a nipper piston unit comprising a hollow cylinder head having a rectangular interior forward area, a cylindrical interior rear area, and a shoulder about the junction of both areas; a piston having a cylindrical extended body slidably disposed in the said cylindrical interior area; a pair of grooves extending longitudinally of opposite areas of the said body; a pair of springs disposed in the grooves limited at one end against the bottoms of the grooves and limited at the other end against the said shoulder; a pair of crossed pivotally connected nipper levers having a slide fit in the rectangular interior area of the cylinder head; a pin pivotally supporting one of the levers to the cylinder head; a cam slide bottomed U-slot centrally of the body of the piston; the said levers having terminal portions disposed in the U-slot in bearing relation to the side walls of the latter, one of the levers having a cam undersurface resting upon the cam slide and adapted to ride up and down the slide as the body of the piston is reciprocated in the cylinder head; the piston having a headed end adapted to be slidably received in the cylinder recess; and the cylinder head having an externally threaded rear portion adapted to be threadedly received in the cylinder recess, the piston being adapted to rotate with the cylinder head as a unit as the cylinder head is threadedly received in the cylinder recess.

8. A power operated nipping tool for cutting wires and the like, comprising a housing providing a piston chamber, a piston reciprocable therein, a forward extension on said piston, a slot in the piston extension, the bottom wall of the slot providing a cam slide inclined downwardly and forwardly, a nipper implement comprising a pair of crossed levers and a pivot disposed forwardly of and externally of the housing connecting said levers to one another, each lever having a jaw extending forward from the pivot and a handle extending rearward from the pivot, the upper handle being integral with the lower jaw and vice versa, securing means restraining axial movement of the upper handle relative to the housing, the lower handle extending into the piston slot and having a cam follower portion adapted to ride up and down the cam slide upon reciprocation of the piston, thereby causing the upper jaw to swing toward and from the lower jaw, said jaws having cutting edges adapted to nip the wire or other object between the jaws upon forward movement of the piston, spring means interposed between the handles to spread the handles and jaws upon rearward movement of the piston, a plurality of compression springs urging the piston rearward relative to the housing, and power means for moving the piston forward with sufficient force to simultaneously overcome the opposition of both of said spring means and the resistance of the wire or other object between the jaws; in which the securing means is a transverse pin and the upper handle is mounted for limited movement about the axis of the pin and in which the pivot connecting said levers to one another is free to shift its axis relative to the housing in response to such limited movement, the axis of the pivot describing a cylindrical arc about the transverse pin as a center.

9. A power operated nipping tool according to claim 8, in which the upper handle is pressed against the housing by the spring means first mentioned to resist relative movement between the upper handle and housing, said spring means being overcome upon application of percussive force in an upward direction against the lower jaw to move the upper handle downward about the pin.

10. A plier tool including a housing closed at one end and open in the other adapted to be held in the palm of the hand and defining a piston chamber, a piston reciprocable in the chamber, a cylinder head mounted in the open end of the housing carrying a plier jaw implement actuable by the piston, and including a spring loaded throttle valve in the housing controlling flow of pneumatic operating fluid to the piston chamber so as to drive the piston on a forward stroke, characterized in that a manipulative lever having a pivot support on the housing is cooperable with the throttle valve so as to actuate the latter against its spring load so as to admit pneumatic fluid to the piston chamber, and a screw adjustably threaded into the housing is cooperable with the lever so as to predetermine the extent of required movement of the latter to actuate the throttle valve.

11. A wire nipping tool comprising a housing having a recess in its front end defining a piston chamber, an open ended cylinder head having a rear portion received in the open end of the recess, a piston reciprocable in the piston chamber having a forwardly extending cam slide, a nipper implement received in the front end of the cylinder head comprising a pair of crossed levers pivtotally connected together, said levers having cooperating cutting jaws forwardly of the pivot connection and having arm portions rearwardly of the pivot connection, spring means interposed between the arm portions biasing the arm portions apart and as a consequence biasing the cutting jaws apart, a fastener located rearwardly of the pivot connection of the levers engaging one of the levers with the cylinder head and restraining axial movement of said lever relative to the cylinder head, the other of the levers having at the rear outer surface of its arm portion a cam follower resting upon the cam slide and against which the cam slide is movable upon reciprocation of the piston to cause the cam follower to ride over the cam slide and cause the lever associated with the cam follower to pivot relative to the other lever, the spring means functioning to bias the arm portion having the cam follower away from the other arm portion as the cam follower rides down the cam slide, and means for selectively adjusting simultaneously the rotative position of the cylinder head relative to the housing, the axial position of the cam follower relative to the piston, and the degree to which the cutting jaws of the nipper element may be biased apart by the compression spring.

References Cited by the Examiner

UNITED STATES PATENTS

| | | | |
|---|---|---|---|
| 492,931 | 3/93 | Baird | 30—180 |
| 2,385,419 | 9/45 | Matulich | 30—180 |
| 2,490,086 | 12/49 | Page | 30—228 |
| 2,493,696 | 1/50 | Potstada | 30—228 |
| 2,722,859 | 11/55 | Stoltz. | |
| 2,776,481 | 1/57 | Northcutt | 30—180 |
| 2,786,450 | 3/57 | Jacobus | 121—21 |
| 2,899,935 | 8/59 | Dalton | 121—21 |
| 2,942,507 | 6/60 | Fischer et al. | |
| 2,990,613 | 7/61 | Keane et al. | 30—180 |
| 2,995,114 | 8/61 | Starr | 121—21 |
| 3,037,208 | 6/62 | Haberstump. | |

FOREIGN PATENTS

| | | |
|---|---|---|
| 1,017,299 | 9/52 | France. |

WILLIAM FELDMAN, *Primary Examiner.*

EDWARD V. BENHAM, *Examiner.*